(12) United States Patent
Shin et al.

(10) Patent No.: US 12,172,511 B2
(45) Date of Patent: Dec. 24, 2024

(54) VEHICLE BODY HAVING BATTERY SUPPORT ARRANGEMENT

(71) Applicants: HYUNDAI MOTOR COMPANY, Seoul (KR); KIA CORPORATION, Seoul (KR)

(72) Inventors: Gyung Hoon Shin, Seoul (KR); Yong Hwan Choi, Seoul (KR); Yu Ri Oh, Hwaseong-si (KR); Wu Hyun Kim, Goyang-si (KR); Hae Kyu Lim, Bucheon-si (KR); Ji Woong Jung, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 309 days.

(21) Appl. No.: 17/744,341

(22) Filed: May 13, 2022

(65) Prior Publication Data

US 2022/0266671 A1 Aug. 25, 2022

Related U.S. Application Data

(63) Continuation-in-part of application No. 17/157,177, filed on Jan. 25, 2021, now Pat. No. 11,824,217.

(30) Foreign Application Priority Data

Aug. 3, 2020 (KR) .................. 10-2020-0096848
Aug. 25, 2021 (KR) .................. 10-2021-0112627

(51) Int. Cl.
*B60K 1/04* (2019.01)
*B60L 50/64* (2019.01)

(52) U.S. Cl.
CPC ............... *B60K 1/04* (2013.01); *B60L 50/64* (2019.02); *B60K 2001/0438* (2013.01)

(58) Field of Classification Search
CPC .... B60K 1/04; B60K 2001/0438; B60L 50/64
See application file for complete search history.

(56) References Cited

U.S. PATENT DOCUMENTS

RE44,994 E 7/2014 Rawlinson et al.
8,980,458 B2 3/2015 Honjo et al.
(Continued)

FOREIGN PATENT DOCUMENTS

JP 4801947 B2 8/2011
JP 5605470 B2 9/2014
(Continued)

OTHER PUBLICATIONS

Office Action mailed Feb. 8, 2023 cited in corresponding U.S. Appl. No. 17/157,177; 14 pp.

(Continued)

*Primary Examiner* — Jason D Shanske
*Assistant Examiner* — James J Triggs
(74) *Attorney, Agent, or Firm* — Lempia Summerfield Katz LLC

(57) ABSTRACT

A vehicle body includes: a vehicle panel spaced apart from a vehicle battery and protecting the vehicle battery; a top support disposed down through the vehicle panel from above and having a top support fixing portion; and a bottom support having a bottom support fixing portion. In particular, the top support connects the vehicle panel and a bush to each other, and the bottom support supports the top support and the bush connected to a cross member of a vehicle with respect to each other through coupling between the top support fixing portion and the bottom support fixing portion.

10 Claims, 2 Drawing Sheets

(56) References Cited

U.S. PATENT DOCUMENTS

| | | | |
|---|---|---|---|
| 10,494,034 B2 | 12/2019 | Makowski | |
| 10,581,133 B2* | 3/2020 | Santoniccolo | ............ H01P 7/04 |
| 10,661,647 B2 | 5/2020 | Hofer | |
| 11,034,227 B2 | 6/2021 | Spielvogel et al. | |
| 11,038,236 B2* | 6/2021 | Montgomery | ...... H01M 50/244 |
| 11,142,058 B2 | 10/2021 | Marquez Duran et al. | |
| 11,155,150 B2 | 10/2021 | Stephens et al. | |
| 11,462,793 B2 | 10/2022 | Kagami et al. | |
| 11,511,612 B2 | 11/2022 | Jeon et al. | |
| 11,539,231 B1 | 12/2022 | Sahoo | |
| 2011/0143179 A1 | 6/2011 | Nakamori | |
| 2012/0156539 A1 | 6/2012 | Honjo et al. | |
| 2014/0302279 A1 | 10/2014 | Pfaffelhuber | |
| 2016/0272246 A1 | 9/2016 | Berger et al. | |
| 2020/0180417 A1 | 6/2020 | Marquez Duran et al. | |
| 2020/0350522 A1 | 11/2020 | Choi et al. | |
| 2022/0037731 A1 | 2/2022 | Jung et al. | |
| 2022/0144060 A1 | 5/2022 | Shin et al. | |
| 2022/0219523 A1 | 7/2022 | Shin et al. | |

FOREIGN PATENT DOCUMENTS

| | | |
|---|---|---|
| KR | 20140045778 A | 4/2014 |
| KR | 101655482 B1 | 9/2016 |
| KR | 20200037237 A | 4/2020 |
| KR | 20220063505 A | 5/2022 |

OTHER PUBLICATIONS

Office Action mailed Jul. 9, 2024 cited in corresponding U.S. Appl. No. 17/707,208; 6 pp.

* cited by examiner

VEHICLE BODY HAVING BATTERY SUPPORT ARRANGEMENT

CROSS REFERENCE TO RELATED APPLICATION

This application is a continuation-in-part of non-provisional U.S. patent application Ser. No. 17/157,177, filed on Jan. 25, 2021, which claims priority to and the benefit of Korean Patent Application Nos. 10-2020-0096848, filed on Aug. 3, 2020 and 10-2021-0112627, filed on Aug. 25, 2021, the entire contents of each of which are incorporated herein by reference.

BACKGROUND

Field

The present disclosure relates to a vehicle body.

Description of the Related Art

Recently, a battery system for an electric vehicle has been highly developed and the development cycle has shortened with development of electric vehicles and relevant technologies. The way of assembling a battery, which is an important part of an electric vehicle, in a vehicle may greatly influence durability of the vehicle against a collision, and noise and vibration generated by parts of the vehicle.

A through-mounting type protruding to the interior and the exterior of a vehicle is generally used for a vehicle body assembly structure in the related art to improve influence durability of the vehicle against a collision and reduce noise and vibration generated by parts of the vehicle. When this vehicle body assembly structure is applied, a battery structure protrudes to the interior of a vehicle, the commercial value of the interior is decreased by protrusion of hardware in the interior.

The description provided above as a related art of the present disclosure is just for helping understanding the background of the present disclosure and should not be construed as being included in the related art known by those having ordinary skill in the art.

SUMMARY

An objective of the present disclosure is to solve the problem of deterioration of the commercial value of the interior of a vehicle due to protrusion of hardware in the interior in the related art by applying a vehicle body structure to which a mounting type that protrudes to the interior and the exterior in consideration of threads inside and outside hardware in a battery structure inside the vehicle body.

In one form of the present disclosure, a vehicle body includes: a vehicle panel spaced apart from a vehicle battery and protecting the vehicle battery; a top support disposed down through the vehicle panel from above, having a top support fixing portion, and connecting the vehicle panel and a bush to each other; and a bottom support having a bottom support fixing portion and supporting the top support and the bush connected to a cross member of a vehicle with respect to each other through coupling between the top support fixing portion and the bottom support fixing portion.

The top support fixing portion may be formed on an outer side of the top support and the bottom support fixing portion may be formed on an inner side and an outer side of the bottom support.

The top support fixing portion formed on the outer side of the top support may be coupled to the bottom support fixing portion formed on the inner side of the bottom support, and the bottom support fixing portion formed on the outer side of the bottom support may be coupled to the bush, whereby the bush and the top support may be supported with respect to each other.

The bottom support fixing portion formed on the inner side of the bottom support may be longer than the bottom support fixing portion formed on the outer side of the bottom support.

The top support fixing portion and the bottom support fixing portion may be threads.

An upper end of the top support may extend to two sides and the top support fixing portion may be formed at a lower end of the top support, whereby the top support may connect the vehicle panel and the bush to each other by passing through the vehicle panel from above.

An upper end of the bottom support may extend to two sides between the vehicle panels and the bottom support fixing portion may be formed at a lower end of the bottom support, whereby the bush and the top support may be supported with respect to each other.

The top support fixing portion and the bottom support fixing portion may be perpendicularly coupled to each other, whereby the bottom support may support the top support and the bush connected to the cross member in a vehicle with respect to each other.

The bush connected to the cross member and may includes a pair of members.

The top support may be spaced apart from the vehicle battery and disposed between the pair of members of the bush.

The bottom support may support the pair of members of the bush and the top support disposed between the pair of members of the bush with respect each other.

The bush may be connected to a lower end of the cross member and the vehicle battery may be disposed under the cross member.

According to the vehicle body of the present disclosure, it is possible to solve the problem of deterioration of the commercial value of the interior of a vehicle due to protrusion of hardware in the interior in the related art by applying a vehicle body structure to which a mounting type that protrudes to the interior and the exterior in consideration of threads inside and outside hardware in a battery structure inside the vehicle body.

The effects of the present disclosure are not limited to the effects described above and other effects can be clearly understood by those having ordinary skill in the art from the following description.

BRIEF DESCRIPTION OF THE DRAWINGS

The above and other objectives, features and other advantages of the present disclosure should be more clearly understood from the following detailed description when taken in conjunction with the accompanying drawings, in which.

DETAILED DESCRIPTION

In the following description, the structural or functional description specified to exemplary embodiments according to the concept of the present disclosure is intended to describe the exemplary embodiments, so it should be understood that the present disclosure may be variously embodied, without being limited to the exemplary embodiments. Hereinafter, exemplary embodiments of the present disclosure are described in detail with reference to the accompanying drawings.

When a component, device, element, or the like of the present disclosure is described as having a purpose or performing an operation, function, or the like, the component, device, or element should be considered herein as being "configured to" meet that purpose or to perform that operation or function.

Figure 1:
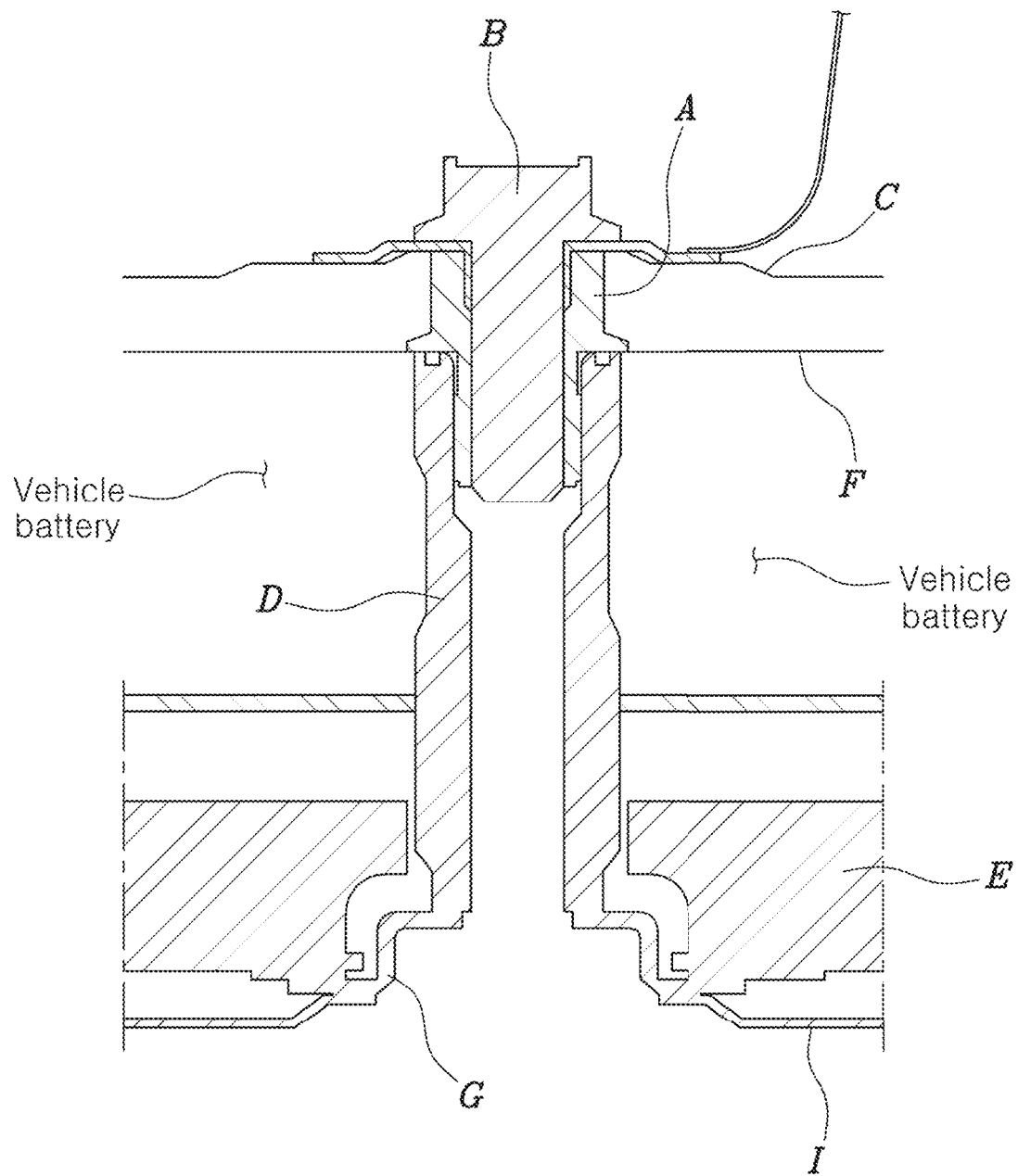
FIG. 1 is a view showing a vehicle body according to an embodiment of the present disclosure.
Figure 2:
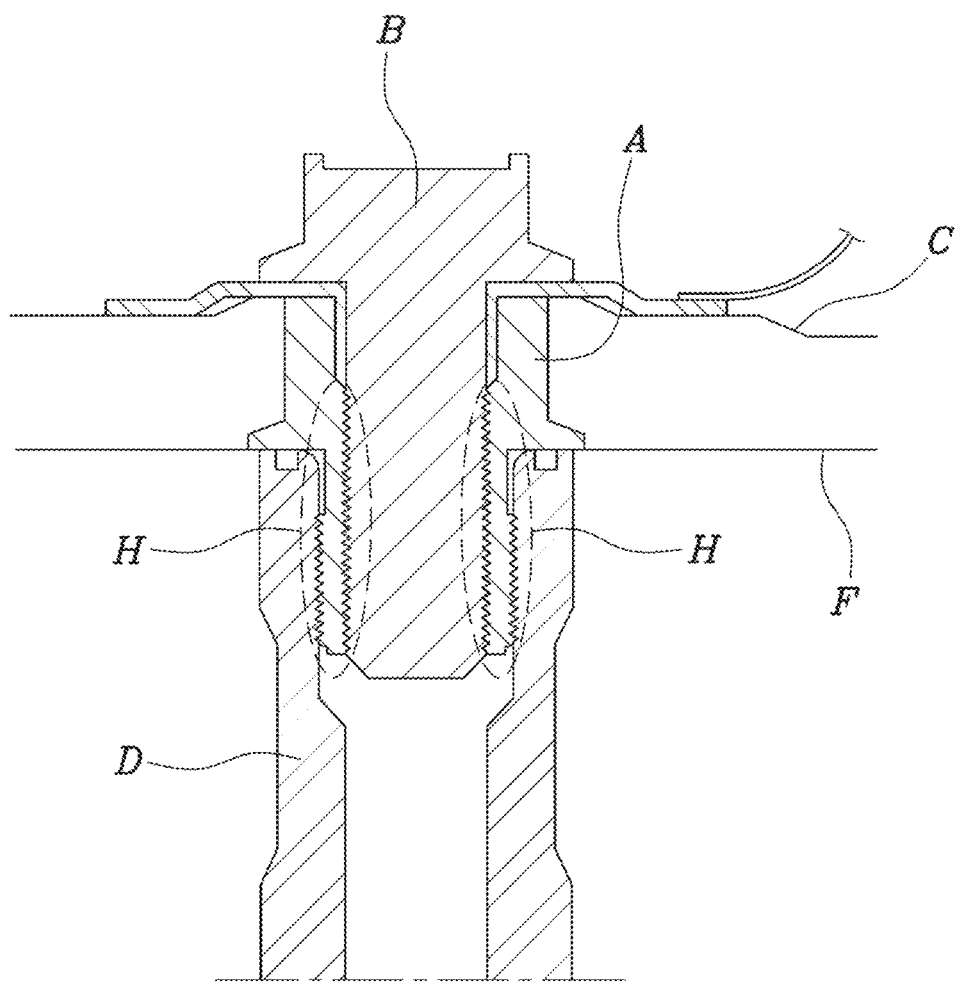
FIG. 2 is a view showing in detail bottom support fixing portions formed on the inner and outer sides of a bottom support.

FIG. 1 is a view showing a vehicle body according to an embodiment of the present disclosure. FIG. 2 is a view showing in detail bottom support fixing portions formed on the inner and outer sides of a bottom support.

FIG. 1 is a view showing a vehicle body according to an embodiment of the present disclosure.

Referring to FIG. 1, a vehicle body includes: a vehicle panel C spaced apart from a vehicle battery and protecting the vehicle battery; a top support B connecting the vehicle panel C and a bush D to each other; and a bottom support A having a bottom support fixing portion H. The top support B is disposed down through the vehicle panel C from above and has a top support fixing portion. The bottom support A supports the top support B and the bush D through coupling between the top support fixing portion and the bottom support fixing portion H. As illustrated in FIG. 1, the bush D is connected to a cross member E of the vehicle.

The present disclosure is characterized by being designed to solve the problem of deterioration of the commercial value of the interior of a vehicle due to protrusion of hardware in the interior in the related art by applying a vehicle body structure to which a mounting type that protrudes to the interior and the exterior in consideration of threads inside and outside hardware in a battery structure inside the vehicle body. To this end, the vehicle body includes the vehicle panel C, the top support B having the top support fixing portion, and the bottom support A having the bottom support fixing portion H, in which the bottom support A is configured to support the top support B and the bush D connected to the cross member E with respect to each other in the vehicle through coupling between the top support fixing portion and the bottom support fixing portion H. A through-mounting type passing through the inside and outside is generally used for a vehicle body assembly structure in the related art to improve influence durability of a vehicle against a collision and reduce noise and vibration generated by parts of a vehicle. When this vehicle body assembly structure is applied, a battery structure protrudes to the interior of a vehicle, the commercial value of the interior is decreased by protrusion of hardware in the interior.

As described above, through-mounting type passing through the inside and outside is generally used for a battery assembly structure that is a vehicle body assembly structure in the related art to improve influence durability of a vehicle against a collision and improve noise and vibration generated by parts of a vehicle. The present disclosure has also been designed to solve the problem of protrusion of a battery structure that is the vehicle assembly structure of the related art while reducing the number of parts although employing the through-mounting type in which the top support B protrudes in the interior from the exterior.

According to an embodiment of the present disclosure, the top support B and the bush D connected to the cross member E support each other through coupling between the top support fixing portion and the bottom support fixing portion H such that influence durability of a vehicle against a collision is improved and noise and vibration generated by parts of the vehicle is also reduced, thereby increasing the commercial value of the interior of the vehicle.

In detail, the vehicle panel C is spaced apart from a vehicle battery and protects the vehicle battery. The vehicle panel C is disposed opposite to a battery bottom plate I and is a part through which the top support B is disposed down from above. The vehicle panel C is generally made of aluminum to reduce the weight of the entire vehicle, and a vehicle body top panel F and the vehicle panel C are manufactured to have a strong structure. The space between the vehicle body top panel F and the vehicle panel C is usually an empty space in which wires for supplying power to the electric parts of the vehicle are disposed. The top support B penetrates through the vehicle panel C in a vertical direction (i.e., penetrating from above the panel C and down to the bush D) such that the top support B having the top support fixing portion connects the vehicle panel C and the bush D to each other. The bottom support A has the bottom support fixing portion H and supports the top support B and the bush D connected to the cross member E of the vehicle through coupling between the top support fixing portion and the bottom support fixing portion H. The top support B is disposed over the bottom support A and is fixed down with the bottom support A from above. When the battery structure is assembled, the bottom support A is disposed between the top support B and the bush D. When the battery structure is assembled, the upper portion of the bottom support A is positioned in the space between the vehicle panel C and the top panel F. The top support B and the bottom support A have the top support fixing portion and the bottom support fixing portion H, respectively, whereby the top support B and the bottom support A are coupled to each other through coupling between the top support fixing portion and the bottom support fixing portion H. It is coupled to the bottom support A through the bush D connected to the cross member E disposed over the battery bottom plate I. The lower end of the cross member E is connected to all the battery bottom plate I, the bush D, and a bracket G, whereby a battery assembly structure can be formed.

The top support fixing portion may be formed on the outer side of the top support B and the bottom support fixing portion H may be formed on the inner and outer sides of the bottom support A.

The top support B has the top support fixing portion and the top support fixing portion is formed on the outer side of the top support B and coupled to the bottom support fixing portion H of the bottom support A, whereby the battery assembly structure can be formed. The top support fixing portion should be formed on the outer side of the top support B and the bottom support fixing portion H should be formed on the inner and outer sides of the bottom support A, so the bottom support A can be coupled to the top support fixing portion formed on the outer side of the top support B and the bottom support fixing portion H formed on the inner side of the bottom support A.

The top support fixing portion formed on the outer side of the top support B is coupled to the bottom support fixing portion H formed on the inner side of the bottom support A, and the bottom support fixing portion H formed on the outer side of the bottom support A is coupled to the bush D, whereby the bush D and the top support B are supported to each other.

The top support fixing portion formed on the outer side of the top support B and the bottom support fixing portion H formed on the inner side of the bottom support A are coupled to the bottom support A. The top support B is moved down while being coupled to the bottom support A, and the bottom support A is moved up while being coupled to the top support B. The bottom support fixing portion H formed on the outer side of the bottom support A is coupled to the bush D and the bottom support A is coupled to all the top support B and the bush D connected to the cross member E by the bottom support fixing portions H formed on both of the inner and outer sides thereof, thereby being able to improve influence durability of a vehicle against a collision and reduce noise and vibration generated by parts of a vehicle.

FIG. 2 is a view showing in detail the bottom support fixing portions H formed on the inner and outer sides of the bottom support A.

Referring to FIG. 2, the bottom support fixing portion H formed on the inner side of the bottom support A is longer than the bottom support fixing portion H formed on the outer side of the bottom support A.

The bottom support fixing portions H are formed on the inner and outer sides of the bottom support A, the bottom support fixing portion H formed on the inner side of the bottom support A is coupled to the top support fixing portion formed on the outer side of the top support B, and the bottom support fixing portion H formed on the outer side of the bottom support A is coupled to the bush D connected to the cross member E in the vehicle, thereby supporting the bush D and the top support B to each other. There is an effect that a battery structure does not protrude in the interior of a vehicle and the commercial value of the interior is improved by the shape of the bottom support fixing portions H formed on the bottom support A.

The top support fixing portion and the bottom support fixing portions H are threads.

A protrusion having a uniform cross-section and spirally formed on the surface of a cylinder or a cone is called a thread, a part is rotated and gradually firmly fixed and the entire length of the part is gradually decreased when it is fastened by the thread. The top support fixing portion formed on the outer side of the top support B and the bottom support fixing portions H formed on the inner and outer sides of the bottom support A are all threads and the top support fixing portion formed on the outer side of the top support B is coupled to the bottom support fixing portion H formed on the inner side of the bottom support A. Accordingly, while the bottom support fixing portion H formed on the outer side of the bottom support A is coupled to the bush D, the top support B is rotated, so the top support B, the bottom support A, and the bush D are gradually firmly fixed to each other.

The upper end of the top support B extends to two sides and the top support fixing portion is formed at the lower end of the top support B, so the top support B is disposed down through the vehicle panel C from above, thereby connecting the vehicle panel C and the bush D to each other.

The top support B is disposed down through the vehicle panel C from above, has the top support fixing-portion, and connects the vehicle panel C and the bush D to each other. The upper end of the top support B extends to two sides and is fixed to the vehicle panel C. Accordingly, the upper end of the top support B is positioned on the vehicle panel C, so the top support B and the vehicle panel C can be firmly fixed.

The upper end of the bottom support A extends to two sides between the vehicle panels C, and the bottom support fixing portions H are formed at the lower end of the bottom support A, thereby supporting the bush D and the upper support B with respect to each other.

The upper end of the top support B extends to two sides and is fixed to the vehicle panel C and the upper end of the bottom support A is disposed under the upper end of the bottom support A, so the bottom support A is positioned between the vehicle panel C and the to panel F. The top support B extends to two sides between the vehicle panels C and is fixed to the vehicle panels C. The bottom support fixing portions H are formed at the lower end of the bottom support A and coupled to the top support fixing portion formed at the lower end of the top support B, thereby being able to support the bush D and the top support B to each other. Accordingly, when the top support B and the bottom support A are coupled to each other, a battery structure in which the vehicle panel C, the top support B, and the bottom support A are integrated can be formed.

The top support fixing portion and the bottom support fixing portions H are perpendicularly coupled to the vehicle body, whereby the bottom support A supports the top support B and the bush D connected to the cross member E in the vehicle with respect to each other.

Since the top support B is vertically disposed down through the vehicle panel C from above, the top support fixing portion formed on the top support B and the bottom support fixing portions H formed on the bottom support A are perpendicularly coupled to each other, whereby the top support B and the bush D connected to the cross member E in the vehicle are supported with respect to each other. The top support fixing portion and the bottom support fixing portions H are perpendicular to the vehicle panel C and the top panel F and force is not applied only in any one direction. Accordingly, the top support B, the bottom support A, and the bush D connected to the cross member E are integrated over a battery, whereby the strength of the vehicle body is increased.

The bush D connected to the cross member E in the vehicle may be composed of a pair of members.

The bush D is connected to the cross member D positioned over the battery bottom plate I, and the cross member E is a long member covering the bottom of the battery. The bush D is connected to the bottom plate I through the bracket G between the cross members E. The bush D is composed of a pair of members such that the bottom support A does not protrude by applying the vehicle body structure to which the mounting type that protrudes to the interior and the exterior is applied.

The top support B is spaced apart from the vehicle battery and is disposed of the pair of members of the bush D.

Since the top support fixing portion and the bottom support fixing portions H are coupled, the top support B is disposed between the pair of members of the bush D to support the top support B and the bush D connected to the cross member E in the vehicle. Accordingly, it is possible to apply a mounting type that protrudes to the interior and the exterior in consideration of the top support fixing portion inside and outside the top support B.

The bottom support A supports the bush D composed of a pair of members and the top support B disposed between the bushes D with respect to each other.

The bottom support A supports the top support B and the bush D connected to the cross member E in the vehicle through coupling between the top support fixing portion and the bottom support fixing portion H, and the top support fixing portion formed on the top support B disposed between the pair or members of the bush D is coupled to the bottom support fixing portion H formed on the inner side of the bottom support A. The top support fixing portion formed on the top support B is coupled to the bottom support fixing portion H formed on the inner side of the bottom support A, whereby the top support B can support the vehicle panel C while passing through the vehicle panel C downward.

The bush D is connected to the lower end of the cross member E and the vehicle battery is disposed under the cross member E.

The bush D is connected to the bottom plate I through the bracket G between the cross members E. The bush D is composed of a pair of members such that the bottom support A does not protrude by applying the vehicle body structure to which the mounting type that protrudes to the interior and the exterior is applied. Since a battery is disposed under the cross member, the battery can be protected from external shock, durability of the vehicle against a collision can be improved, and noise and vibration generated by parts of the vehicle can be reduced.

Although the present disclosure was described above in relation to specific embodiments shown in the drawings, it is apparent to those having ordinary skill in the art that the present disclosure may be changed and modified in various ways without departing from the scope of the present disclosure.

What is claimed is:

1. A vehicle body comprising:
a vehicle panel spaced apart from a vehicle battery and configured to protect the vehicle battery;
a top support disposed down through the vehicle panel from above and including a top support fixing portion, the top support configured to connect the vehicle panel and a bush to each other; and
a bottom support including a bottom support fixing portion and configured to support the top support and the bush through coupling between the top support fixing portion and the bottom support fixing portion, wherein the bush is connected to a cross member of a vehicle, wherein the top support fixing portion is formed on an outer side of the top support and the bottom support fixing portion is formed on an inner side and an outer side of the bottom support, and
wherein the top support fixing portion is coupled to the bottom support fixing portion formed on the inner side of the bottom support, and the bottom support fixing portion formed on the outer side of the bottom support is coupled to the bush, whereby the bush and the top support are supported with respect to each other.

2. The vehicle body of claim 1, wherein the bottom support fixing portion formed on the inner side of the bottom support is longer than the bottom support fixing portion formed on the outer side of the bottom support.

3. The vehicle body of claim 1, wherein the top support fixing portion and the bottom support fixing portion are threads.

4. The vehicle body of claim 1, wherein an upper end of the top support extends to two sides and the top support fixing portion is formed at a lower end of the top support, whereby the top support connects the vehicle panel and the bush to each other by passing down through the vehicle panel from above.

5. The vehicle body of claim 1, wherein an upper portion of the bottom support is positioned in a space between the vehicle panel and a top panel, and the bottom support fixing portion is formed at a lower end of the bottom support, whereby the bush and the top support are supported with respect to each other.

6. The vehicle body of claim 1, wherein the top support fixing portion and the bottom support fixing portion are perpendicularly coupled to each other, whereby the bottom support supports the top support and the bush connected to the cross member.

7. The vehicle body of claim 1, wherein the bush includes a pair of members.

8. The vehicle body of claim 7, wherein the top support is spaced apart from the vehicle battery and disposed between the pair of members of the bush.

9. The vehicle body of claim 8, wherein the bottom support supports the pair of members of the bush and the top support disposed between the pair of members of the bush with respect to each other.

10. The vehicle body of claim 1, wherein the bush is connected to a lower end of the cross member and the vehicle battery is disposed under the cross member.

* * * * *